(12) United States Patent
Wang

(10) Patent No.: US 6,581,737 B2
(45) Date of Patent: Jun. 24, 2003

(54) ANCHORING APPARATUS FOR MULTI-SECTION PULLING BAR OF TRUNKS

(76) Inventor: Chien-Shan Wang, No. 80, Tianshin, Tianshin Li, Yuanli Jen, Miaoli (TW)

( * ) Notice: Subject to any disclaimer, the term of this patent is extended or adjusted under 35 U.S.C. 154(b) by 61 days.

(21) Appl. No.: 09/946,352

(22) Filed: Sep. 6, 2001

(65) Prior Publication Data
US 2003/0042092 A1 Mar. 6, 2003

(51) Int. Cl.[7] ............................................. A45C 13/00
(52) U.S. Cl. .................. 190/115; 280/47.371; 280/655; 16/113.1
(58) Field of Search ..................... 190/115; 16/113.1; 280/47.371, 655, 37

(56) References Cited

U.S. PATENT DOCUMENTS

| | | | | |
|---|---|---|---|---|
| 5,781,965 A | * | 7/1998 | Lu ............................. | 16/113.1 |
| 6,128,806 A | * | 10/2000 | Shou-Mao ................. | 16/113.1 |
| 6,226,834 B1 | * | 5/2001 | Lu ............................. | 16/113.1 |
| 6,338,587 B1 | * | 1/2002 | Kuo ........................... | 16/113.1 |
| 6,347,432 B1 | * | 2/2002 | Kuo ........................... | 16/113.1 |
| 6,357,080 B1 | * | 3/2002 | Tsai ........................... | 16/113.1 |
| 6,378,674 B1 | * | 4/2002 | Lee ............................ | 16/113.1 |
| 6,405,407 B1 | * | 6/2002 | Chen ......................... | 16/113.1 |

* cited by examiner

Primary Examiner—Tri M. Mai
(74) Attorney, Agent, or Firm—Rosenberg, Klein & Lee

(57) ABSTRACT

An anchoring apparatus includes an upper anchoring assembly located at a lower end of the inner tube of a pulling bar assembly and a lower anchoring assembly located at a lower end of the middle tube of the pulling bar assembly. The lower anchoring assembly has a lower engaging seat which has a coupling bore and an aperture formed on the side walls for housing a lower extensible button. When the bottom end of the upper anchoring assembly is located above the top end of the lower anchoring assembly, a jutting stub of the lower extensible button may be urged to retract and an anchor bolt may be extended to engage with the anchor bore of the outer tube of the pulling bar assembly to thereby keep the pulling bar in a steady and secured condition.

1 Claim, 10 Drawing Sheets

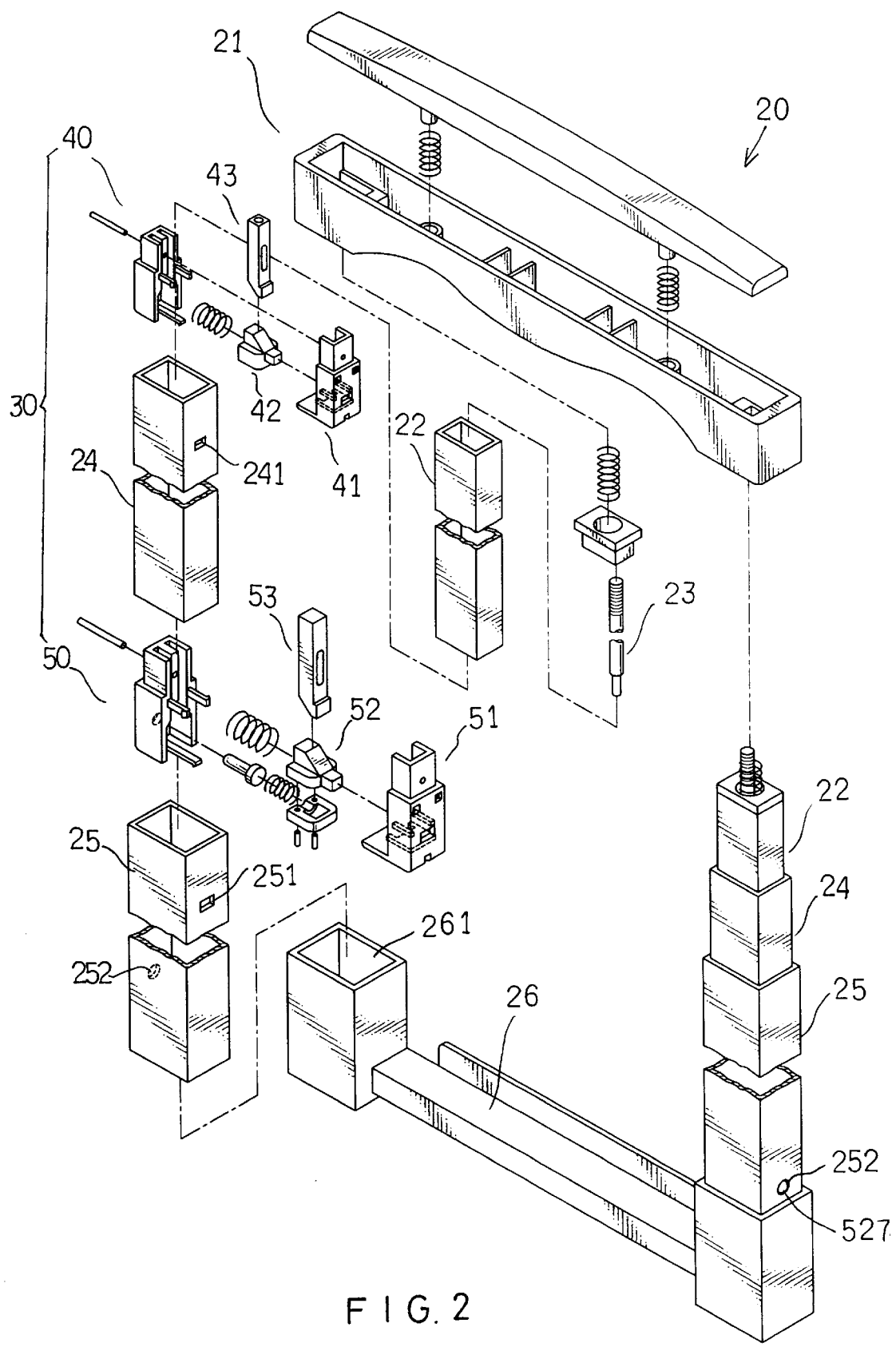
F I G. 2

US 6,581,737 B2

ANCHORING APPARATUS FOR MULTI-SECTION PULLING BAR OF TRUNKS

BACKGROUND OF THE INVENTION

1. Field of the Invention

The invention relates to an anchoring apparatus for multi-section pulling bar of trunks and particularly an anchoring apparatus that allows the pulling bar latched securely at selected locations when the multi-section pulling bar is collapsed and retracted.

2. Description of the Prior Art

A commonly used multi-section pulling bar 10 for trunks (as shown in FIG. 1) mainly includes a handle 11 with two ends thereof engaging respectively with an inner tube 12. The inner tube 12 has a linkage bar 121 run through therein to fasten to an anchoring means 15. The inner tube 12 is housed in a middle tube 13 which in turn is housed in an outer tube 14. The middle tube 13 has a plurality of latching bores 131 formed on the tubular wall and another anchoring means 15 located at the bottom of the middle tube 13. The anchoring means 15 has an inner clip tube 151 which has a control element 152 located therein. The control element 152 has one end connecting the linkage bar 121 and another end 153 engaging with a clip tongue 153. The clip tongue 153 has a rear end coupled with a spring 154. The clip tongue 153 is driven by the linkage bar 121 to couple with the latching bores for mooring the tubes thereby to provide the pulling bar collapsible function. However the structure set forth above still has drawbacks when in use, notably:

When the handle 11 is not being grasped and depressed, the inner tube 12 tends to stop in the middle tube 13, and the middle tube tends to stop in the outer tube 14, while the anchoring means 15 of the inner tube 12 is engaged with the latching bore 131, the clip tongue 153 of the another anchoring means 15 of the middle tube 13 is not extended. Hence the middle tube 13 and outer tube 14 do not engage securely and positively. When the pulling bar is retracted, the middle tube 14 and outer tube 15 tend to wobble. There are still rooms for improvement.

SUMMARY OF THE INVENTION

In view of aforesaid disadvantages, it is a primary object of the invention to provide an anchoring apparatus that allows multi-section pulling bar of a trunk to engage and position firmly and securely.

The anchoring apparatus of the invention mainly includes an anchoring bore at the bottom section of the outer tube to match a jutting stub of a lower anchoring means and an anchor bolt of a lower extensible button such that when the pulling bar is extended, the jutting stub of the lower anchoring means will be extended to engage with an latch bore of the outer tube, and when the pulling bar is retracted the anchoring bolt will be extended to engage with the anchoring bore of the outer tube.

The foregoing, as well as additional objects, features and advantages of the invention will be more readily apparent from the following detailed description, which proceeds with reference to the accompanying drawings.

BRIEF DESCRIPTION OF THE DRAWING

FIG. 2 is an exploded view of the invention.

DESCRIPTION OF THE PREFERRED EMBODIMENT

Figure 1:
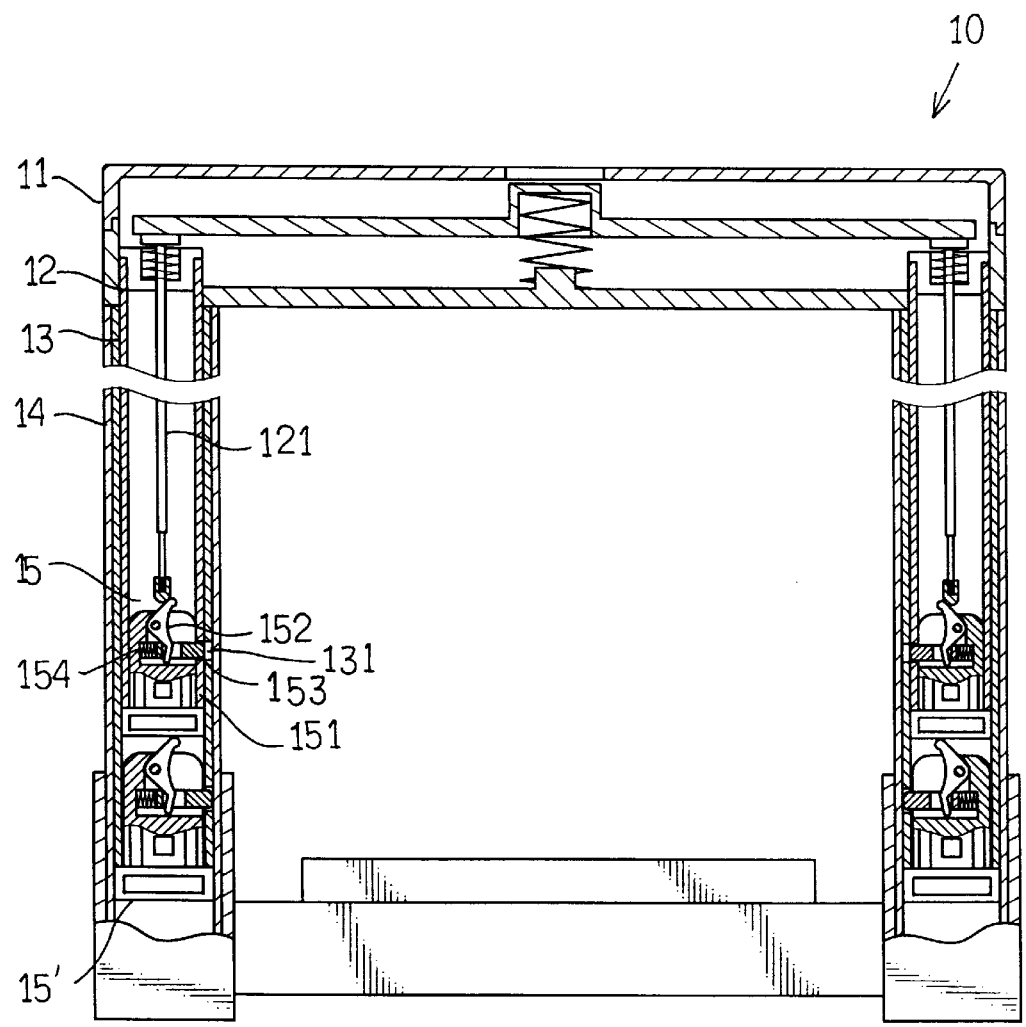
FIG. 1 is a schematic view of a conventional pulling bar for trunks.
Figure 3:
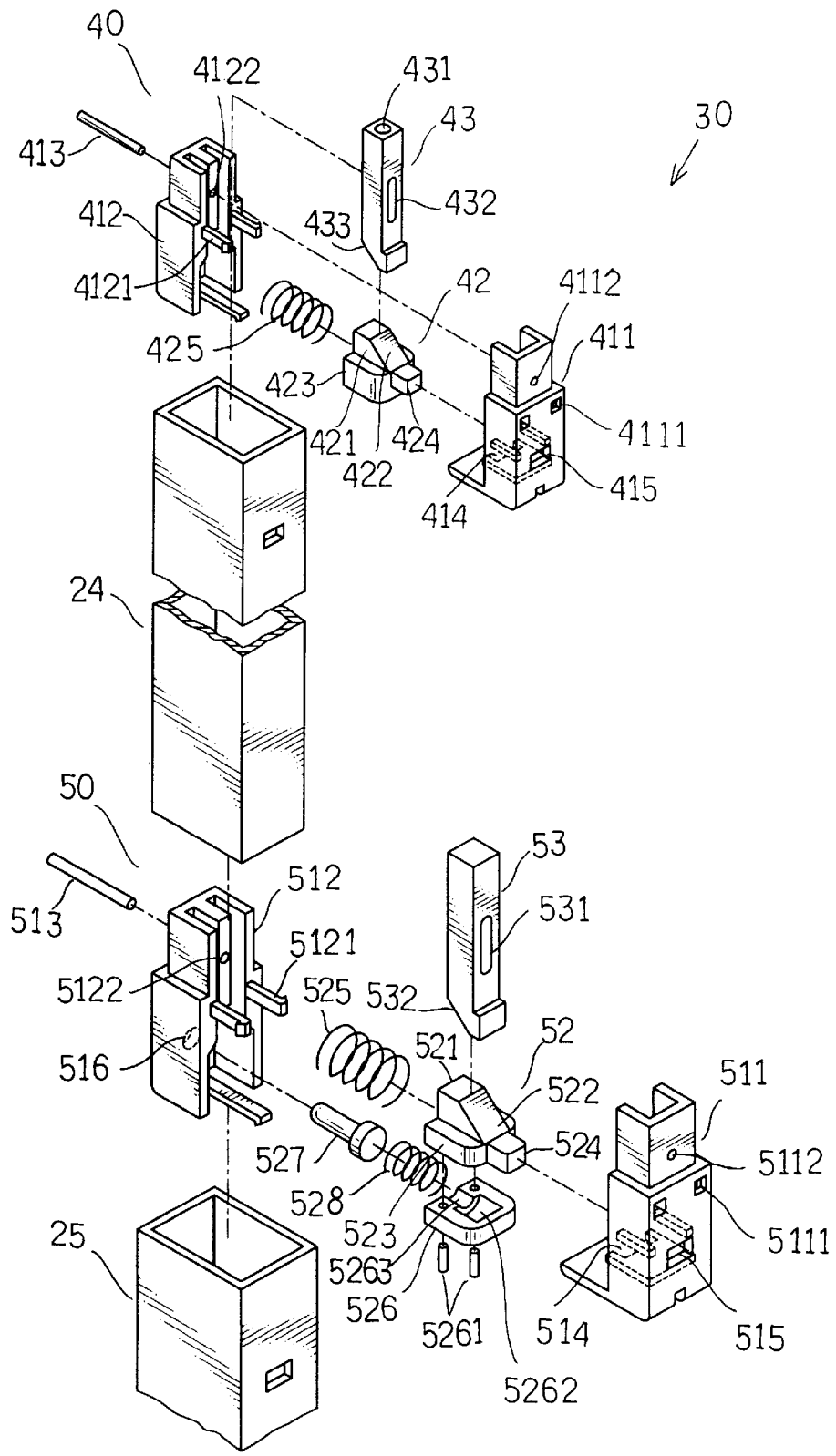
FIG. 3 is an exploded view of anchoring means of the invention.
Figure 4:
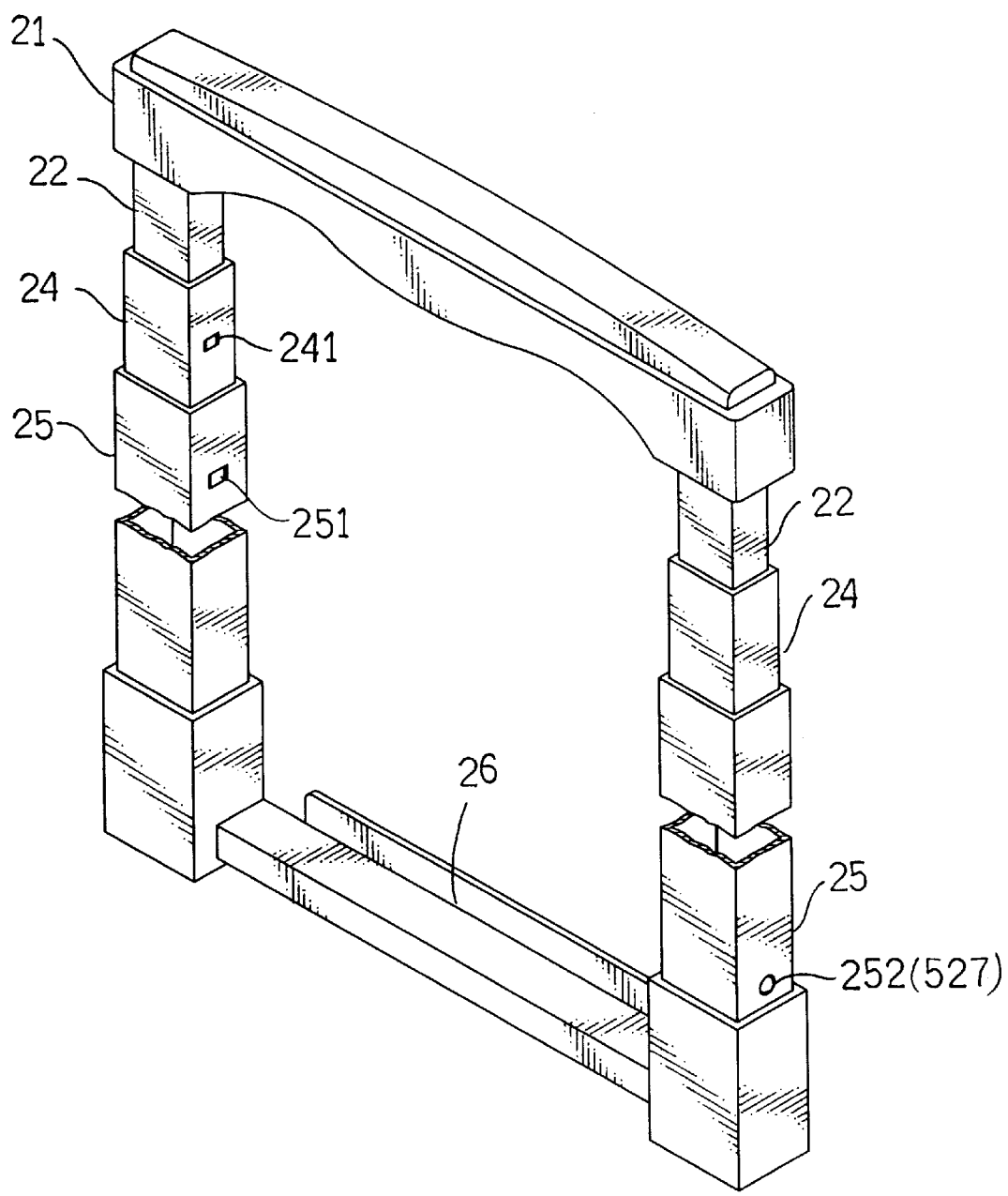
FIG. 4 is a perspective view of the invention.
Figure 5:
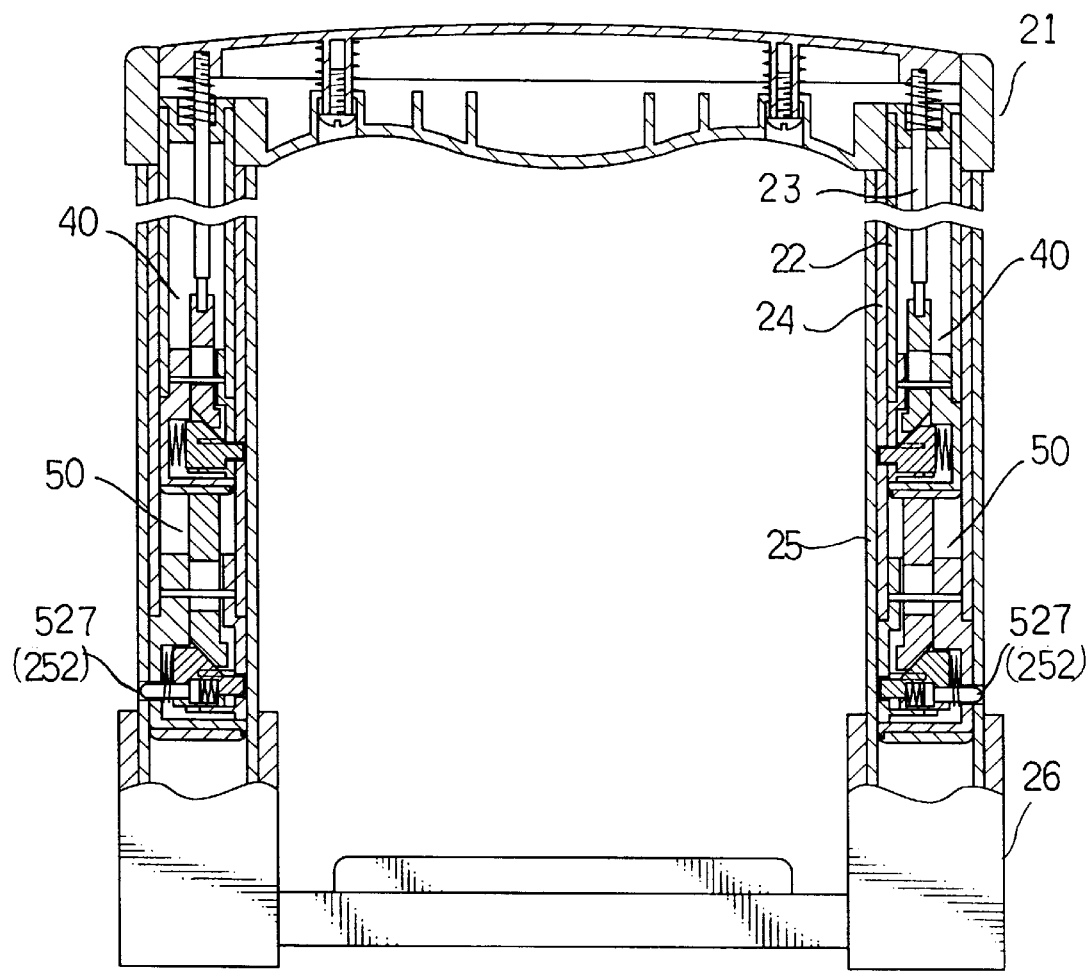
FIG. 5 is a fragmentary sectional view of the invention, under operation.
Figure 6:
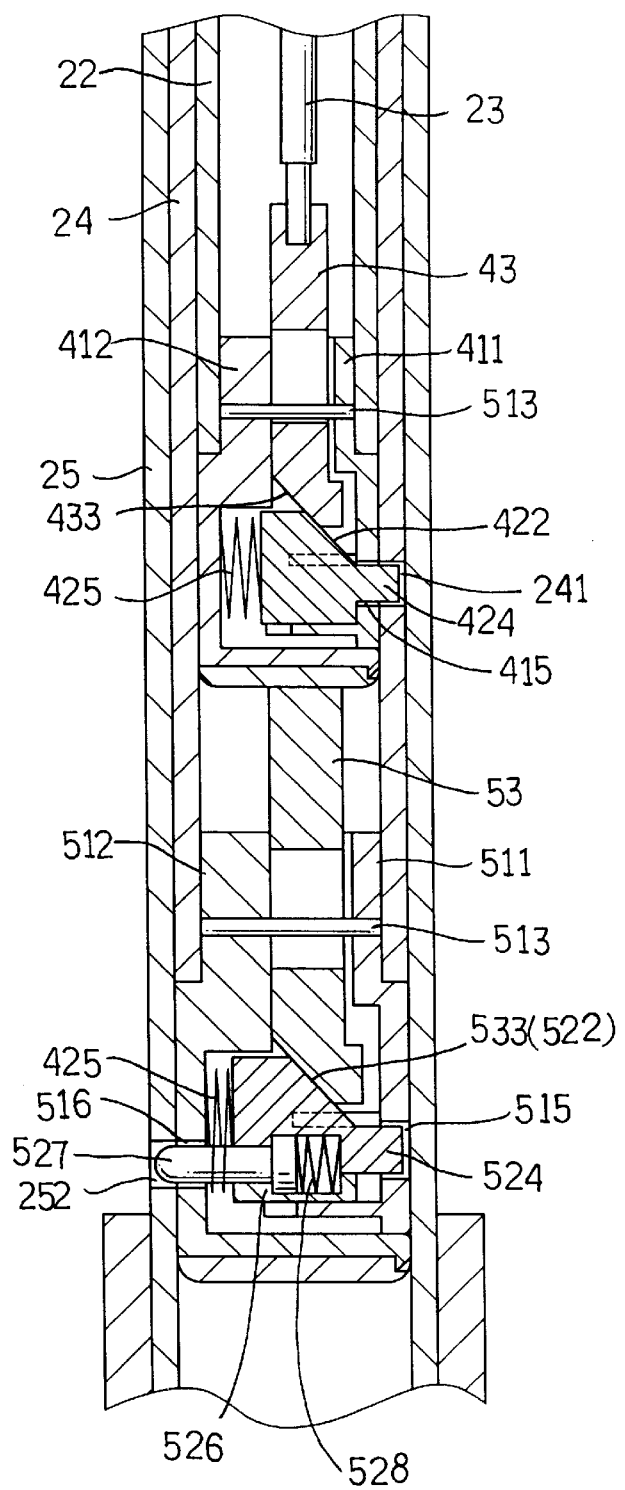
FIG. 6 is a fragmentary enlarged view of FIG. 5.

Referring to FIGS. 2 through 10, the anchoring apparatus 30 of the invention is located in a pulling bar means 20 and includes a handle 21 which has two ends each has a bottom side fastened to an inner tube 22. The inner tube 22 has a linkage bar 23 located therein. The linkage bar 23 is coupled with a spring 231. The inner tube 22 is housed in a middle tube 24, and the middle tube 24 is housed in an outer tube 25. The middle tube 24 has a plurality of first latch bores 241 formed on the tubular wall. The outer tube 25 also has second latch bores 251 formed on the tubular wall thereof. The outer tube 25 has a bottom section engaged with a coupling bore 261 of a base seat 26. The anchoring apparatus 30 consists of an upper anchoring means 40 located at a lower end of the inner tube 22 and a lower anchoring means 50 located at a lower end of the middle tube 24, wherein:

the outer tube 25 has an anchoring bore 252 located at the bottom section thereof;

the upper anchoring means 40 includes:

an upper engaging seat 41 which has a first coupling member 411 with a plurality of first coupling bores 4111 formed on a side wall thereof to couple with first latch fingers 4121 of a first wedge member 412 for forming the upper engaging seat 41. The first coupling member 411 has a first guide channel 414 located therein and a first guide bore 415 formed on the side wall. The first coupling member 411 and the first wedge member 412 further have respectively a first aperture 4112, 4122 formed at an upper section mating with each other for receiving a first latch bolt 413;

an upper extensible button 42 located in the upper engaging seat 41 having a first chamfer block 421 which has a first slant chamfer plane 422 and a first base seat 423 at the bottom thereof. The first base seat 423 has two sides slidable in the first guide channel 414 of the upper engaging seat 41, and a first jutting stub 424 located at the same side as the first slant chamfer plane 422 of the first chamfer block 421. There is a first spring 425 located at another side of the upper extensible button 42 opposite to the first jutting stub 424; and an upper strut 43 having a first coupling bore 431 formed at an upper end to engage with the bottom end of the linkage bar 23, a first longitudinal through slot 432 to allow the first latch bolt 413 of the upper engaging seat 41 to pass through, and a first slant bottom section 433;

the lower anchoring means 50 includes:

a lower engaging seat 51 which has a second coupling member 511 with a plurality of second coupling bores 5111 formed on a side wall thereof to couple with second latch fingers 5121 of a second wedge member 512 for forming the lower engaging seat 51. The second coupling member 511 has a second guide channel 514 located therein and a second guide bore 515 formed on the side wall. The second coupling member 511 and the second wedge member 512 further have respectively a second aperture 5112, 5122 formed at an upper section mating with each other for receiving a second latch bolt 513;

a lower extensible button 52 located in the lower engaging seat 51 having a second chamfer block 521 which has a second slant chamfer plane 522 and a second base seat 523 at the bottom thereof. The second base seat 523 has two sides slidable in the second guide channel 514 of the lower engaging seat 51, and a second jutting stub 524 located at the same side as the second slant chamfer plane 522 of the second chamfer block 521. There is a second spring 525 located at another side of the lower extensible button 52 opposite to the second jutting stub 524; The second base seat 523 further has the bottom side fastened to a bottom lid 526 through a plurality of fastening bolts 5261. The bottom lid 526 has an indented recess 5262 which has one side formed a trough 5263 for holding a anchor bolt 527. The anchor bolt 527 has a rear end pushed by a third spring 528 such that the anchor bolt 527 may be moved and extended through a third aperture 516 formed on the lower engaging seat 51; and a lower strut 53 having a second longitudinal through slot 531 to allow the second latch bolt 513 of the lower engaging seat 51 to pass through, and a second slant bottom section 532;

When the handle 21 of the pulling bar means 20 is not being depressed, the upper extensible button 42 of the upper anchoring means 40 is extended outside the latch bore 221 of the inner tube 22 and is engaged with the first latch bore 241 of the middle tube 24. The lower end of the upper engaging seat 41 of the upper anchoring means 40 is located above the lower strut 53 of the lower anchoring means 50, and urges the lower strut 53 downwards, the second slant bottom section 532 of the lower strut 53 mating the second slant chamfer plane 522 of the lower extensible button 52, hence the lower extensible button 52 is pushed by the lower strut 53 to retreat the second jutting stub 524 of the lower extensible button 52, while the anchor bolt 527 is extended through the anchor bore 252 of the outer tube 25. The pulling bar means 20 thus is at a retracted and anchored condition (shown in FIGS. 7 and 8).

Figure 7:
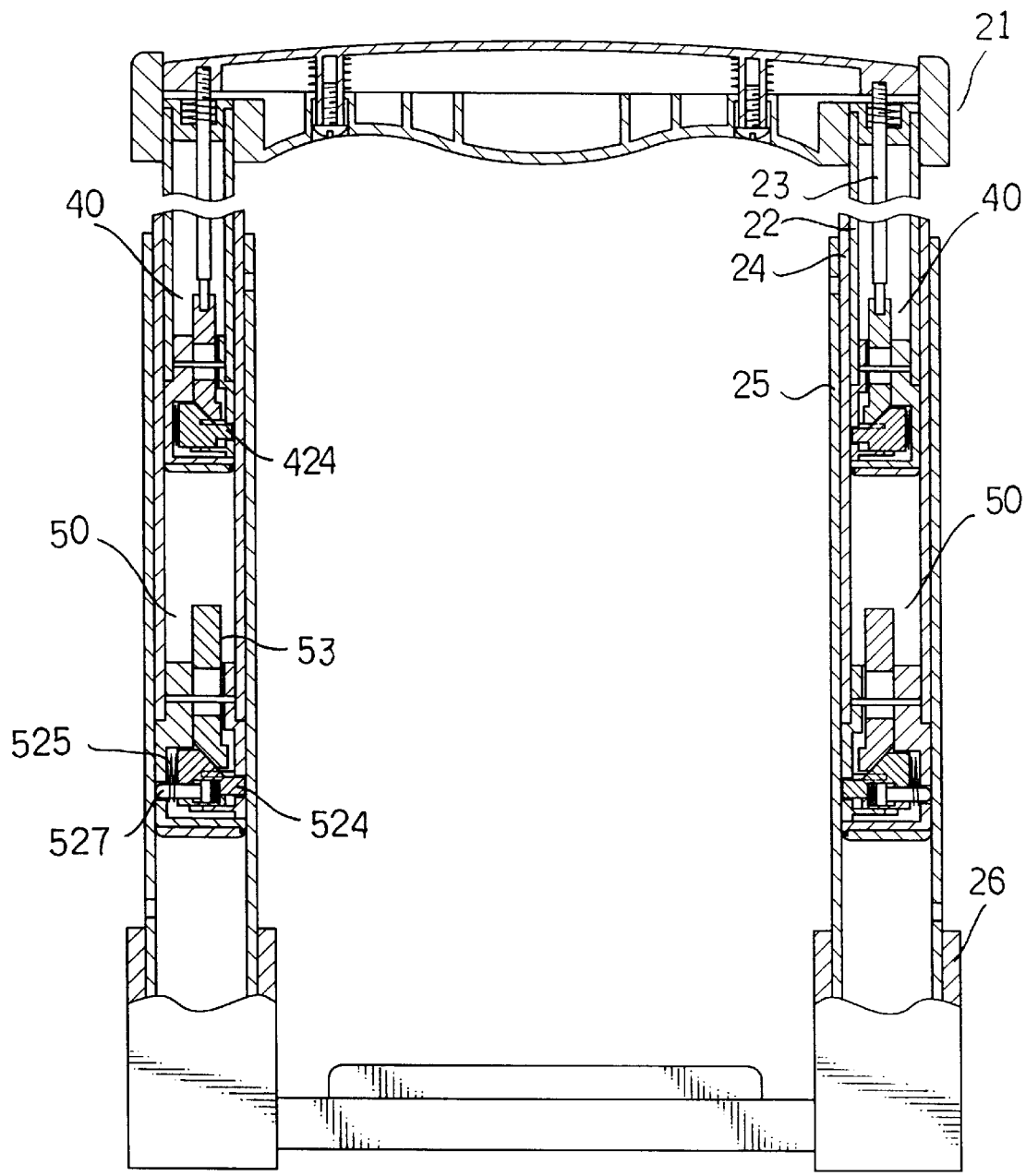
FIG. 7 is another fragmentary sectional view of the invention, under operation.
Figure 8:
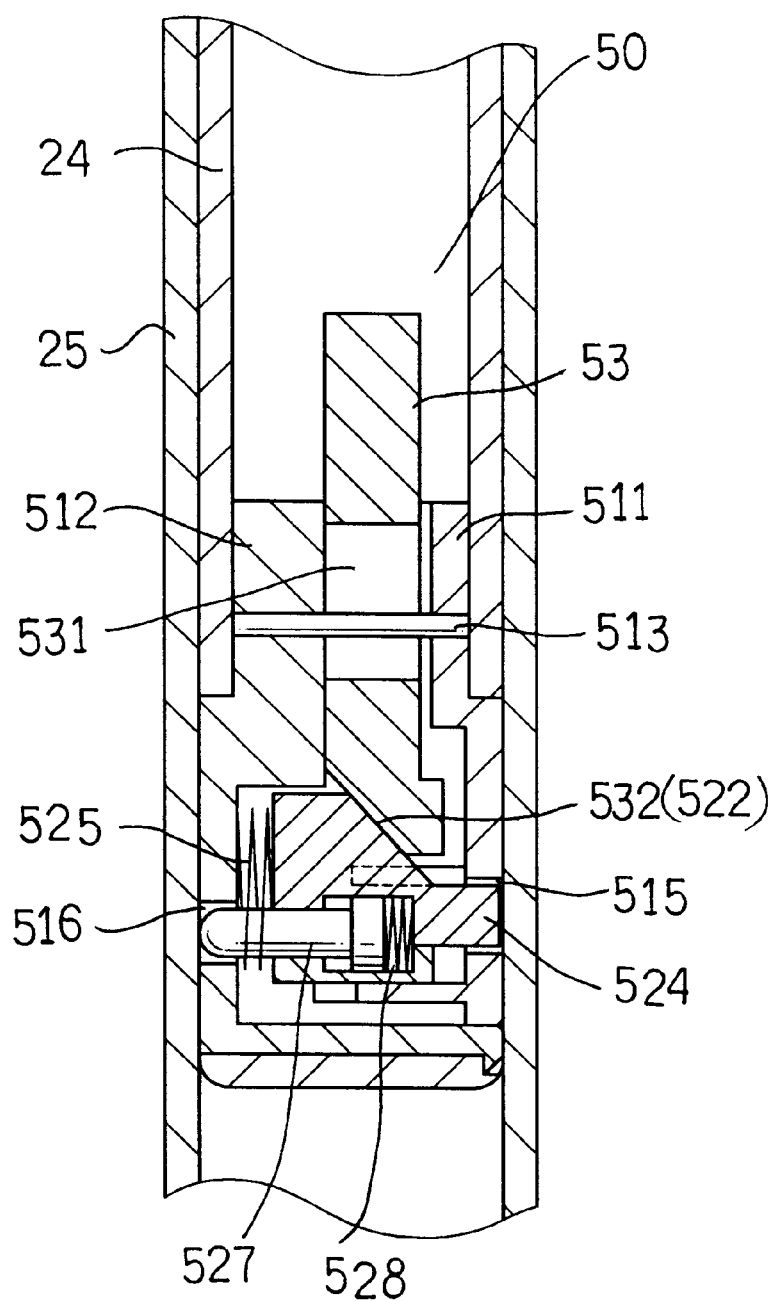
FIG. 8 is a fragmentary enlarged view of FIG. 7.
Figure 9:
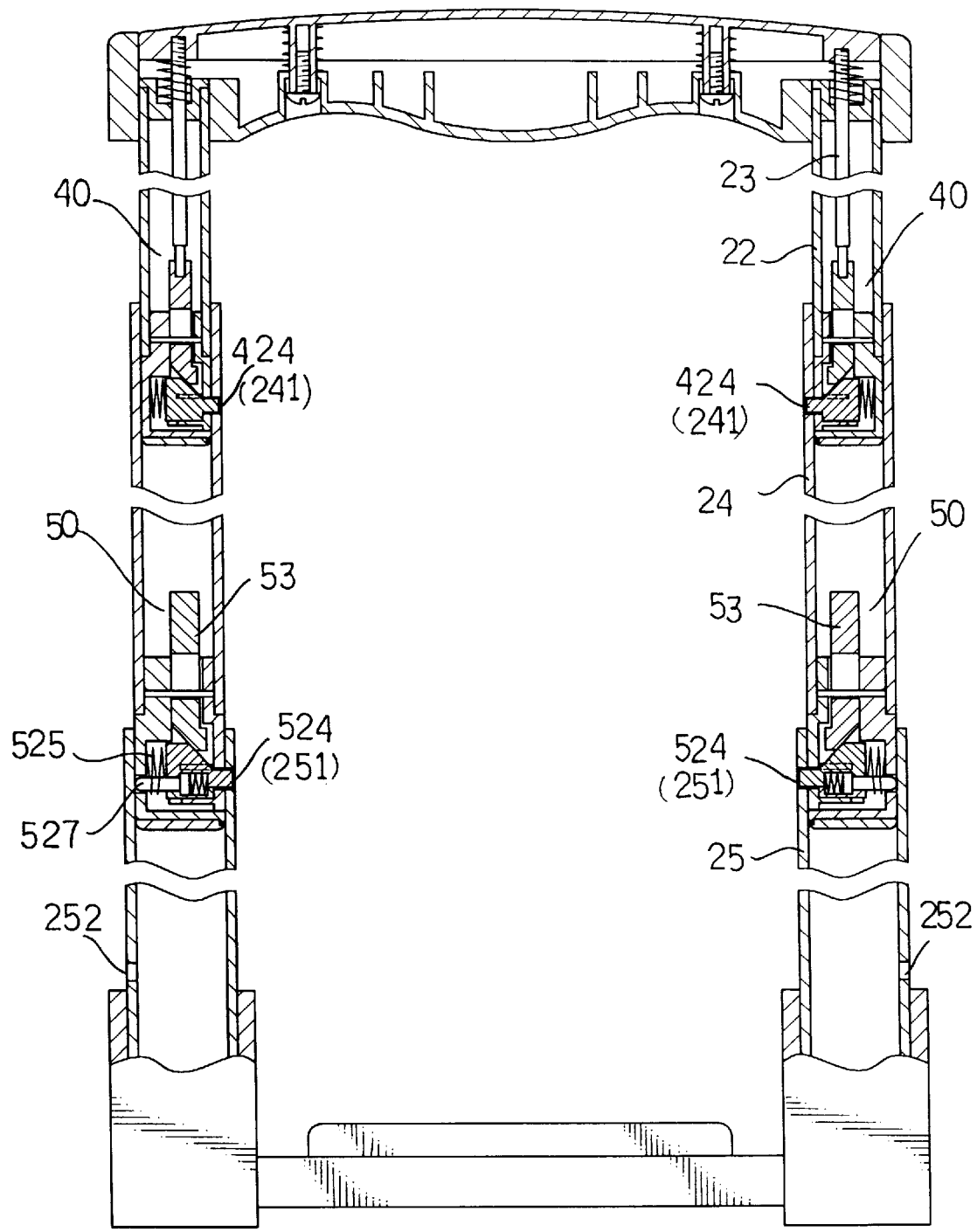
FIG. 9 is yet another fragmentary sectional view of the invention, under operation.
Figure 10:
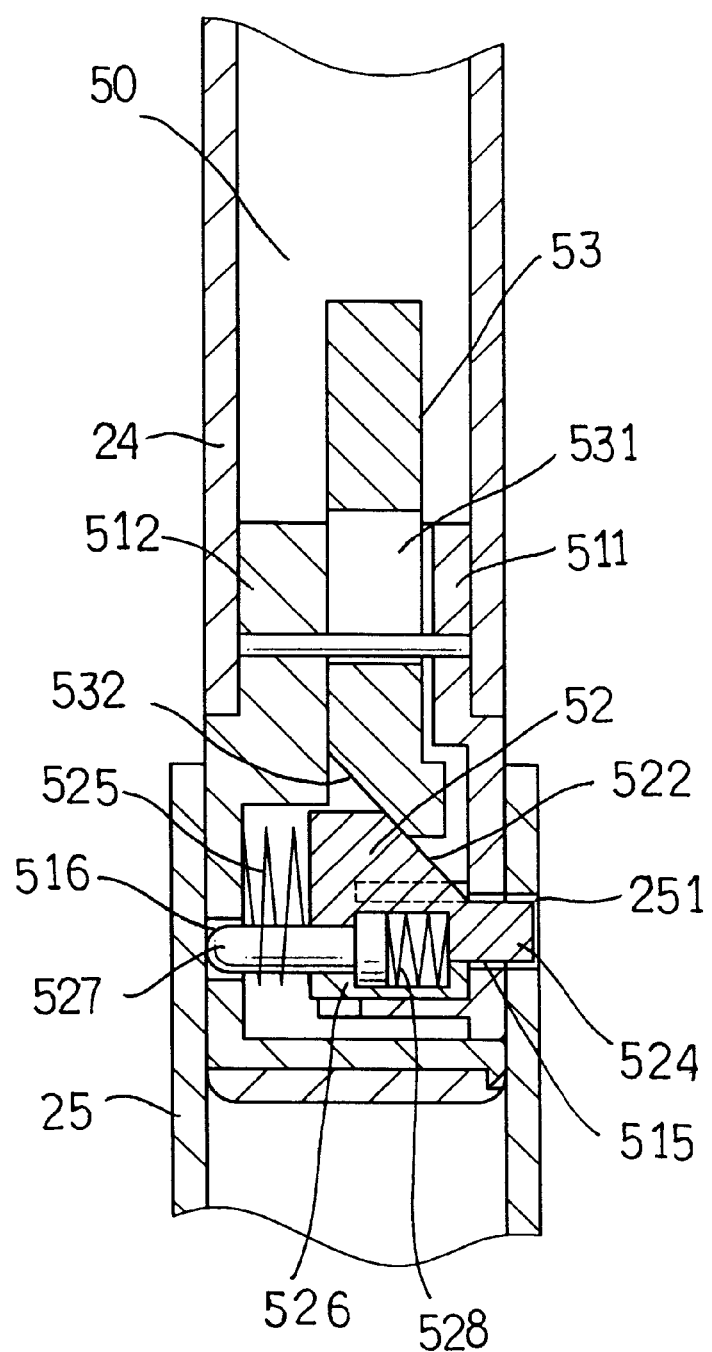
FIG. 10 is a fragmentary enlarged view of FIG. 9.

When the handle is depressed, the linkage bar 23 is moved downwards, the bottom end of the linkage bar 23 pushes the upper strut 43 of the upper anchoring means 40 downwards, the first slant bottom section 433 no longer mating the first slant chamfer plane 422 of the upper extensible button 42, the first slant chamfer plane 422 is retracted (with the first spring 425 under compression), the first jutting stub 424 of the upper extensible button 42 is disengaged from the first latch bore 241, and the inner tube 22 may be pulled upwards by the handle 21 of the pulling bar means 20, the bottom of the upper anchoring means 40 will be separated form the lower strut 53 of the lower anchoring means 50. The lower strut 53 will be returned to its original position due to the elastic force of the second spring 525, and the anchor bolt 527 will be retracted and disengaged from the anchor bore 252 of the outer tube 25. As a result, the middle tube 24 may be pulled out (as shown in FIGS. 7 and 8) until the second jutting stub 524 of the lower extensible button 52 engaging with the second latch bore 251 of the outer tube 25, and the first jutting stub 424 of the upper anchoring means 40 may engage with the first latch bore 241 of the middle tube 24 to allow the pulling bar be pulled to the highest point for moving the trunk (as shown in FIGS. 9 and 10).

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

I claim:

1. An anchoring apparatus for a multi-section pulling bar of a trunk located in a pulling bar means which includes a handle having two ends each has a bottom side fastened to an inner tube with a linkage bar located therein coupled with a spring, the inner tube being housed in a middle tube and the middle tube being housed in an outer tube, the inner tube having latch bores formed on the inner tubular wall at the bottom section thereof, the middle tube having a plurality of first latch bores formed on the middle tubular wall thereof, the outer tube having second latch bores formed on the outer tubular wall thereof and a bottom section engaged with a coupling bore of a base seat, the anchoring apparatus comprising an upper anchoring means located at a lower end of the inner tube and a lower anchoring means located at a lower end of the middle tube, wherein:

the outer tube has an anchor bore located at the bottom section thereof;

the upper anchoring means includes:

an upper engaging seat which has a first coupling member with a plurality of first coupling bores formed on a side wall thereof to couple with first latch fingers of a first wedge member for forming the upper engaging seat, the first coupling member having a first guide channel located therein and a first guide bore formed on the side wall, the first coupling member and the first wedge member having respectively a first aperture formed at an upper section mating with each other for receiving a first latch bolt;

an upper extensible button located in the upper engaging seat having a first chamfer block which has a first slant chamfer plane and a first base seat at the bottom thereof, the first base seat having two sides slidable in the first guide channel of the upper engaging seat, and a first jutting stub located at the same side as the first slant chamfer plane of the first chamfer block, the upper extensible button further having a first spring located at another side opposite to the first jutting stub; and an upper strut having a first coupling bore formed at an upper end to engage with the bottom end of the linkage bar, a first longitudinal through slot to allow the first latch bolt of the upper engaging seat to pass through, and a first slant bottom section;

the lower anchoring means includes:

a lower engaging seat which has a second coupling member with a plurality of second coupling bores formed on a side wall thereof to couple with second latch fingers of a second wedge member for forming the lower engaging seat, the second coupling member having a second guide channel located therein and a second guide bore formed on the side wall, the second coupling member and the second wedge member further having respectively a second aperture formed at an upper section mating with each other for receiving a second latch bolt;

a lower extensible button located in the lower engaging seat having a second chamfer block which has a second slant chamfer plane and a second base seat at the bottom thereof, the second base seat having two sides slidable in the second guide channel of the lower engaging seat, and a second jutting stub located at the same side as the second slant chamfer plane of the second chamfer block, the lower extensible button having a second spring located at another side opposite to the second jutting stub, the second base seat further having the bottom side fastened to a bottom lid through a plurality of fastening bolts, the bottom lid having an indented recess which has one side formed a trough for holding an anchor bolt, the anchor bolt having a rear end pushed by a third spring for moving and extending the anchor bolt through a third aperture formed on the lower engaging seat; and a lower strut having a second longitudinal through slot to allow the second latch bolt of the lower engaging seat to pass through, and a second slant bottom section;

wherein the anchor bore of the outer tube is matching and engageable with the lower extensible button and the anchor bolt of the lower anchoring means such that the second jutting stub of the lower anchoring means is extensible to engage with the latch bore of the outer tube when the pulling bar means is extended, and the anchor bolt is extensible to engage with the anchor bore of the outer tube when the pulling bar means is retracted.

* * * * *